Jan. 11, 1927.
C. C. WORTHINGTON
1,614,333
TRACTOR PROPELLED LAWN MOWER
Filed June 17, 1922
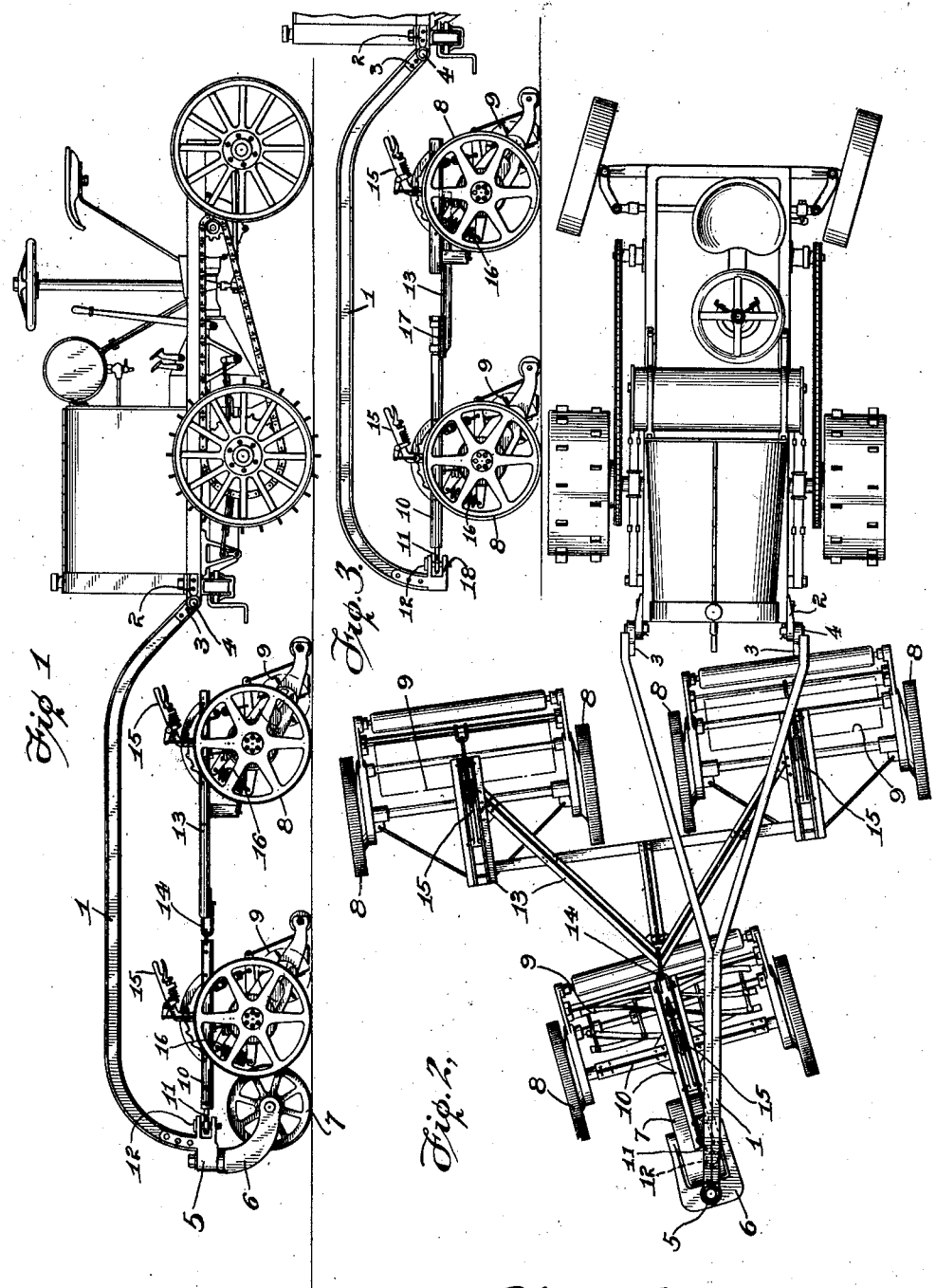

Patented Jan. 11, 1927.

1,614,333

UNITED STATES PATENT OFFICE.

CHARLES C. WORTHINGTON, OF DUNFIELD, NEW JERSEY.

TRACTOR-PROPELLED LAWN MOWER.

Application filed June 17, 1922. Serial No. 568,926.

The invention relates to lawn mowing apparatus and more especially consists in the combination of a tractor and forwardly extending means, movably connected thereto, for propelling a gang of lawn mower units ahead of the tractor, so that the driver may have full view of the mower units at work.

The accompanying drawing exemplifies the principle of the invention in its preferred form, but such principle may be variously incorporated in lawn mowing apparatus as will hereafter be made apparent.

In the drawing, Figure 1 is a side elevation of the invention and Figure 2 a top plan thereof with certain parts omitted for the sake of clearness, Fig. 3 being a modification.

The tractor shown will be understood from the drawing to comprise a suitable automotive engine mounted on a vehicle frame and having change speed and transmission gearing and a pair of front driving wheels which are chain-driven from the differential jack shaft and provided with cleats to avoid slipping on the turf. The vehicle is steered by its rear wheel or wheels, which are mounted on steering knuckles of automobile type as indicated in Figure 2. The rear steering of the tractor affords special advantages in conjunction with this invention as will later appear, but however is not essential, and moreover any kind of tractor might be substituted in the place of the one shown without departing from the broad invention. The forwardly extending frame structure marked 1 and herein referred to as the pilot frame is connected to the vehicle in any suitable manner so that it projects beyond the front end thereof with freedom to move vertically with respect to the vehicle, but not horizontally. The form of connection in the present case is constituted of a pair of horizontally perforated hinge brackets 2, bolted or riveted to the front of the vehicle side girders, at a low point, and in laterally spaced relation, their mutual separation being preferably as great as the width of the vehicle frame will permit. This pilot frame is constituted of two angle or channel bars secured together at their forward ends and divergently spaced at their rear ends where they are fastened to, or provided with, horizontally perforated hinge members 3 adapted to be pinned respectively to the vehicle bracket 2 by the hinge bolts 4. These bolts are removable; cotter pins are used to retain them in place. The forward ends of the frame bars are secured to a casting 5 constituting the swivelled seat for the trailing stock 6 of a caster wheel 7 by which the front end of the pilot frame is supported from the ground.

The lawn mower units are connected to the forwardly extending structure, thus supported, and occupy the space immediately ahead of the tractor but not so close thereto as to obstruct access to the engine starting crank; for the same reason the space between the divergent arms of the pilot frame is open and unobstructed so that the operator can stand between them when cranking the engine. The mower units shown are each constituted of ground wheels 8 geared to and driving a rotary cutter 9 in the usual way and may be assumed to be of the same general construction as commonly found in gang lawn mower units. They may be connected to the pilot frame in various ways to keep them in positions to cut slightly overlapping swaths while accommodating the undulations of the ground and they are preferably arranged and united in two transverse rows by an articulated framework which permits one row to assume different horizontal angles with respect to the other and also permits each unit to operate on ground of a different elevation from the others. In the present case, wherein the gang consists of only three units, the single unit constitutes the front row and the two other units the rear row and the articulate framework which unites and spaces them in this relation is the same as shown in my co-pending and prior application, Serial No. 381,029, filed May 13, 1920, and which is well known in the art. Such a framework comprises a frame section 10 for the front unit, the forward end of which is provided with a shackle 11 adapted to be removably attached to the pilot frame by a vertical pin 12, thus forming a loose joint and a pivotal draft connection having a vertical axis. This joint is located on the casting 5 or close to the swivel axis of the caster wheel and ahead of the journal axis or center of said wheel, as shown in Figure 1, so that said caster wheel trails toward or into the space between the ground wheels 8 of the front row, thereby economizing the over-all length of the equipment. The looseness of the pivotal connection, just referred to, allows the front row or front unit as the case may be, to tilt in vertical transverse planes independently of the pilot frame. The rear section 13 of the uniting and spacing framework is shackle-jointed at 14 to the front section 10 so that it may also assume different vertical transverse angles and also different horizontal angles with respect to the front unit and the pilot frame, and this rear section is connected to the rear units so as to hold them in transverse alignment to permit each to tilt in the vertical transverse plane of its own cutter axis relatively to said section and each other. It will be seen that this organization adapts each unit to operate on ground of different elevation from the other units and from the pilot and vehicle frames regardless of different angles of tilt which the units of the vehicle may be required to assume. When the gang comprises more than three units it is desirable to arrange them also in two transverse rows and in such cases the frame arrangement shown for example in my prior Patent No. 1,398,481 may be usefully employed.

The cutter mechanism of each unit may be lifted from the ground, turning about the axis of its ground wheels, when it is desired to remove them from action or to mow a high cut of the grass, and for this purpose the frame sections carry regulating means in the form of a lever 15 for each unit. The detail of this cutter lifting mechanism is also well known to the art, besides being shown in said application and need not be here described further than to say that the hand levers are available not only to vary the elevation of the cutter mechanism, but also to adjust the tension of the springs 16 which press the cutters toward the ground.

Referring to Figure 1, it will be noted that the line of draft, from the pivot joint 12 on the pilot frame to the several units is relatively low and close to the level of the unit wheel centers and also approximately at the same level as the horizontal joint 4 on the tractor, and further that the pilot frame itself is curved or bowed upwardly in order to provide clearance for the units and their hand levers when turning corners on uneven ground. This relative arrangement together with a certain amount of longitudinal flexibility of the curved pilot, insures easy traction and minimizes the strain on the connections especially when encountering abrupt grades or bumps in the lawn. In many cases it is practicable to locate the horizontal hinged connection of the pilot frame on the front axle of the tractor, which is of course lower than the frame thereof and thus provide a maximum degree of separation of the two pinned joints as will be apparent, and this location of the said joint is included as a part of the present invention.

In the operation of the apparatus the effect of steering by the rear wheels is to swing the caster wheel laterally, and about an imaginary pivot center located between the cleated driving wheels, and to about the same extent because said caster wheel is separated from said center by a distance not much greater than the rear wheels, the consequence of which is that the gang can be easily and accurately guided and the cleats on the driving wheels exercise the least tendency to tear up the turf when the apparatus is driven on curves or around corners. On such occasions it will be understood that the gang in its entirety and also the individual rows of units, both change their angular relation to the pilot frame, according to the degree of curvature freely following the caster wheel, with no tendency for any of the ground engaging wheels to slide sideways, which would of course mark and injure the turf. Experience has demonstrated that tractors for lawn mowing purposes should be as light as consistent with adequate traction without injury to the lawn in order to avoid the hardening effect of repeated roller pressure and with the arrangement described this result is obtainable and a light tractor may be used and is of course preferred, although it will be understood that the wheels of the tractor used may be heavy rollers if desired without departing from the principle of the invention. The pilot frame may also be constructed in various designs and its manner of connection to the vehicle may of course be varied according to the design of the tractor. By making the connection detachable the tractor can be disconnected from the mowers when it is wanted for use for general hauling purposes. The front trailing rolling means, represented in the present case by the conventional caster stock and wheel may obviously be varied in its design and function provided it has a swivel, or a swivel-like joint permitting it to trail and follow the front of the frame and also has a wheel or wheels or equivalent rolling means, preferably ball-bearing for engaging the ground; it is preferred to use a simple wheel with a fairly broad tread, as shown, which has no appreciable rolling-down effect on the grass although it will be obvious that any type of rolling means, for example a mower unit could be employed in its place, and where employed, as shown in Figure 3, the universal joint 14 connecting the front and rear rows of the units is substituted by a fifth wheel 17 which keeps the front and rear frame sections always horizontal but otherwise permits freedom of angular relative movement horizontally and vertically. In this construction that portion of the front frame section which is to the rear of the front row of units is adapted, by its weight and connection, to support, without tipping, the weight of the pilot frame which is shackled to the forward extension of the said frame at the point 18. It is considered preferable however in the interest of simplicity and convenience of maintenance to attach all the units in non-supporting relation to the pilot frame, substantially as above described in connection with Figs. 1 and 2.

Claims:

1. The combination of a motor vehicle, a pilot frame connected to and in advance of the vehicle and movable vertically in respect thereto, means for supporting said frame from the ground and a plurality of lawn mower units connected to said pilot frame ahead of the vehicle.

2. The combination defined by claim 1 characterized by the location of the connection between pilot frame and vehicle at a low point on the latter.

3. The combination defined by claim 1 in which the motor vehicle has a rear steering wheel or wheels.

4. The combination defined in claim 1 in which the pilot frame extends upwardly from its point of connection with the motor vehicle, and over the mower units, said units being connected to the pilot frame at a level approximating the level of the frame connection to the vehicle.

5. The combination defined in claim 1 in which the pilot frame comprises divergently related frame bars adapted for horizontal pivotal connection to the front of the vehicle and provides an unobstructed open space immediately in front of the vehicle engine.

6. The combination defined by claim 1 in which the pilot frame is supported on a caster-like rolling means and comprises frame members which are secured to a part, constituting, for the caster-like rolling means, the swivel seat and also constituting the point of connection for lawn mower units.

7. The combination defined by claim 1 in which the pilot frame is supported on a caster-like rolling means having a journaled axis, and mower units are connected to said frame in rear of said journal axis.

8. The combination defined by claim 1 in which the pilot frame is supported by a caster-like rolling means having a swivel axis, and mower units are connected to said frame in rear of said swivel axis.

9. The combination of a motor vehicle, a pilot frame connected to and in advance of the vehicle and movable vertically in respect thereto, a caster-like rolling means supporting said frame from the ground and a plurality of lawn mower units connected to said pilot frame in front and rear rows ahead of the vehicle.

10. The combination of a motor vehicle, a pilot frame connected to and in advance of the vehicle and movable vertically in respect thereto, means for supporting said frame from the ground and a plurality of rows of lawn mower units connected to said pilot frame ahead of the vehicle, the rear row of units being adapted to assume different horizontal angles with respect to said frame and to move angularly in vertical transverse planes.

11. The combination of a motor vehicle, a pilot frame connected to and in advance of the vehicle, and movable vertically in respect thereto, means for supporting said frame from the ground and a plurality of rows of lawn mower units connected to said pilot frame and adapted to assume different horizontal angles with respect to said frame, the connection of the front row of said units to said frame being located in advance of the journal axis of said caster wheel.

12. The combination of a motor vehicle, a pilot frame connected to and in advance of the vehicle and movable vertically in respect thereto, caster-like rolling means having a swivel-joint supporting connection with said pilot frame and a plurality of lawn mower units connected to said frame in rear of said swivel connection and in front of the vehicle.

In testimony whereof, I have signed this specification.

CHARLES C. WORTHINGTON.